US010375527B1

(12) United States Patent
Price et al.

(10) Patent No.: US 10,375,527 B1
(45) Date of Patent: Aug. 6, 2019

(54) NOTIFICATION OF INCORRECT LOCATION

(71) Applicant: International Business Machines Corporation, Armonk, NY (US)

(72) Inventors: Dana L. Price, Surf City, NC (US); Carolyn Carpenter, Apex, NC (US); Daniel Schartner, Pittsburgh, PA (US); James Blye, Cary, NC (US); John Schubert, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/019,706

(22) Filed: Jun. 27, 2018

(51) Int. Cl.
| H04W 4/02 | (2018.01) |
| H04W 4/024 | (2018.01) |
| H04W 64/00 | (2009.01) |
| H04L 29/08 | (2006.01) |
| H04W 4/029 | (2018.01) |
| G01C 21/20 | (2006.01) |

(52) U.S. Cl.
CPC ............ *H04W 4/029* (2018.02); *H04L 67/18* (2013.01); *H04W 4/024* (2018.02); *H04W 4/025* (2013.01); *H04W 64/003* (2013.01); *G01C 21/206* (2013.01)

(58) Field of Classification Search
CPC ..... H04W 4/029; H04W 4/024; H04W 4/025; H04W 64/003; H04L 67/18; G01C 21/206
USPC .............................................. 455/456.1–457
See application file for complete search history.

(56) References Cited

U.S. PATENT DOCUMENTS

| 7,394,405 B2 | 7/2008 | Godden |
| 8,669,844 B2 | 3/2014 | Walker et al. |
| 9,961,507 B1* | 5/2018 | Mendelson ............. H04W 4/90 |

(Continued)

FOREIGN PATENT DOCUMENTS

| WO | 2015016933 A1 | 2/2015 |
| WO | 2017172849 A1 | 10/2017 |

OTHER PUBLICATIONS

Sandberg, Warren, Automatic Detection and Notification of 'Wrong Patient-Wrong Location' Errors in the Operating Room, Surgical Innovation, vol. 12, No. 3, Sep. 2005, pp. 253-260.

(Continued)

*Primary Examiner* — Marisol Figueroa
(74) *Attorney, Agent, or Firm* — Maeve M Carpenter; Maxine L. Barasch; Keohane & D'Alessandro PLLC (57) ABSTRACT

Disclosed embodiments provide techniques for notification of potential entry into an incorrect location. A user location is monitored via a mobile electronic device and an indoor positioning system. An intended floorplan zone is obtained via calendar information, social media information, ticketing information, manual entry, or other suitable mechanism. User speed is monitored. Based on user speed and/or deceleration, nearby floorplan zone categories are checked. If the floorplan zone does not match the intended floorplan zone, but the category is identical to that of the intended floorplan zone, an alert is issued to the user via the mobile electronic device that is associated with the user. This provides an unobtrusive way to alert users before entering a room. Thus, disclosed embodiments can prevent disruptions, thereby increasing productivity and also serving to reduce embarrassment of users caused by entering the wrong location within a venue.

20 Claims, 8 Drawing Sheets

(56) References Cited

U.S. PATENT DOCUMENTS

| | | | |
|---|---|---|---|
| 2014/0018096 A1* | 1/2014 | Jagannath | H04W 4/021 455/456.1 |
| 2014/0309934 A1 | 10/2014 | Ricci | |
| 2015/0110259 A1 | 4/2015 | Kaye et al. | |
| 2017/0124362 A1 | 5/2017 | Sheng et al. | |

OTHER PUBLICATIONS

Morrison, Sara, "Observant Senator Went to the Wrong Meeting and talked to the Wrong Guy for Two Minutes", TheAtlantic.com, Apr. 4, 2014, 4 pgs.

Hudspeth, Christopher, "20 Embarrassing Moments We Never Want to Happen", thoughtcatalog.com, Sep. 21, 2012, 14 pgs.

* cited by examiner

FIG. 1A

| Floorplan Zone | Category |
|---|---|
| Room 102 | Meeting |
| Room 104 | Restroom |
| Room 106 | Meeting |
| Room 108 | Meeting |
| Room 110 | Lab |
| Room 112 | Lab |
| Room 114 | Meeting |
| Room 116 | Food |

NOTIFICATION OF INCORRECT LOCATION

FIELD

Embodiments of the invention relate to systems and methods for notification of incorrect location.

BACKGROUND

Meetings, classes, conventions, conferences, etc., may be held in large buildings or areas with many rooms or sections. They may be held in office buildings, schools, hotels, convention centers, or other buildings with numerous rooms. In many cases, the attendees are unfamiliar with the building. Determining in which direction to move, or what room to enter, may not be intuitive. Sometimes, a person may inadvertently enter the wrong room and disturb a class being held or a presentation being given. This can be embarrassing to the person who entered, as well as disruptive to the attendees in that room.

SUMMARY

In one embodiment, there is provided a computer-implemented method comprising: obtaining a categorized venue floorplan; obtaining a schedule for a user; determining an intended floorplan zone corresponding to a timeslot for the schedule; determining a category for the intended floorplan zone; monitoring a current location of the user; monitoring a current speed of the user; and in response to detecting a speed reduction to a speed below a predetermined speed threshold in proximity to a floorplan zone that is at a different location than the intended floorplan zone and has an identical category to the intended floorplan zone, issuing an alert on an electronic mobile device associated with the user.

In another embodiment, there is provided an electronic computing device comprising: a processor; a memory coupled to the processor, the memory containing instructions, that when executed by the processor, perform the steps of: obtaining a categorized venue floorplan; obtaining a schedule for a user; determining an intended floorplan zone corresponding to a timeslot for the schedule; determining a category for the intended floorplan zone; monitoring a current location of the user; monitoring a current speed of the user; and in response to detecting a speed reduction to a speed below a predetermined speed threshold in proximity to a floorplan zone that is at a different location than the intended floorplan zone and has an identical category to the intended floorplan zone, issuing an alert on an electronic mobile device associated with the user.

In yet another embodiment, there is provided a computer program product for an electronic computing device comprising a computer readable storage medium having program instructions embodied therewith, the program instructions executable by a processor to cause the electronic computing device to: obtain a categorized venue floorplan; obtain a schedule for a user; determine an intended floorplan zone corresponding to a timeslot for the schedule; determine a category for the intended floorplan zone; monitor a current location of the user; monitor a current speed of the user; and in response to detecting a speed reduction to a speed below a predetermined speed threshold in proximity to a floorplan zone that is at a different location than the intended floorplan zone and has an identical category to the intended floorplan zone, issue an alert on an electronic mobile device associated with the user.

BRIEF DESCRIPTION OF THE DRAWINGS

Features of the disclosed embodiments will be more readily understood from the following detailed description of the various aspects of the invention taken in conjunction with the accompanying drawings.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

Disclosed embodiments provide techniques for notification of potential entry into an incorrect location. A user location is monitored via a mobile electronic device (e.g., smartphone, smart watch, etc.) and an indoor positioning system. An intended floorplan zone is obtained via calendar information, social media information, ticketing information, manual entry, or other suitable mechanism. User speed is monitored. Based on the user speed and/or deceleration, nearby floorplan zone categories are checked. If the floorplan zone does not match the intended floorplan zone, but the category is identical to that of the intended floorplan zone, an alert is issued to the user via the mobile electronic device that is associated with the user.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

Figure 1A:
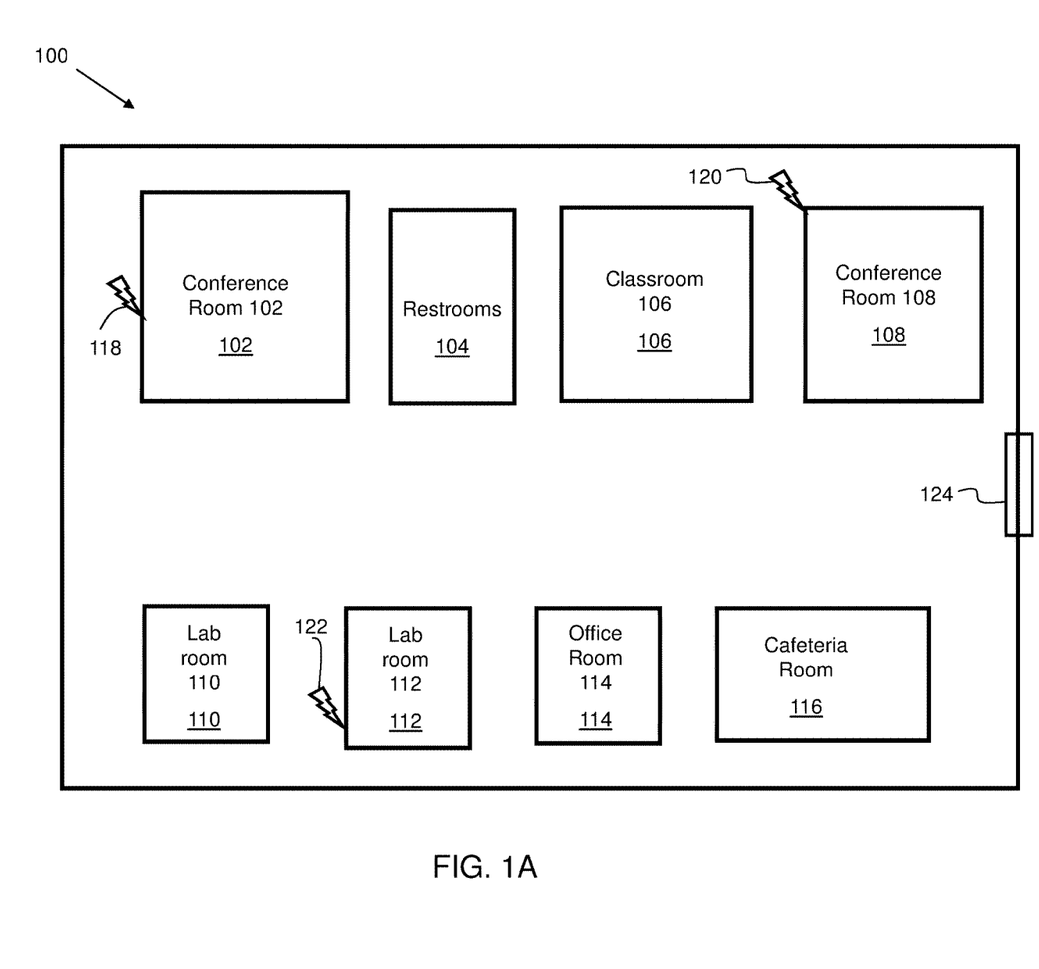
FIG. 1A shows an exemplary venue with an indoor positioning system.

FIG. 1A shows an exemplary venue 100 with an indoor positioning system. In the example, venue 100 is a college campus building including various rooms indicated by reference numbers 102-116. The zones of the floorplan of the venue may be set/determined using a geolocation system (such as GPS), an indoor positioning system (using Wi-Fi, or Bluetooth®) relying on beacons and/or triangulation, or other suitable technology. In the exemplary venue 100, there are 8 rooms (in addition to the hallway), each of which constitutes a zone. There is conference room 102 at reference no. 102, restrooms at reference no. 104, classroom 106 at reference no. 106, conference room 108 at reference no. 108, lab room 110 at reference no. 110, lab room 112 at reference no. 112, office room 114 at reference no. 114, and cafeteria room at reference no. 116.

The indoor positioning system (IPS) allows a mobile device, being carried with or worn by a user, to determine its position within the venue 100. In embodiments, multiple wireless transmitters 118, 120, and 122 are situated within venue 100. The wireless transmitters may be radio frequency (RF) beacons, Wi-Fi transmitters, Bluetooth® transmitters, or other suitable protocol. When a user enters the venue 100 at entrance 124, his/her mobile device makes a location assessment within the venue by use of the wireless transmitters. The location assessment may be accomplished by triangulation, beacon proximity, or other technique.

In some embodiments, the indoor positioning system may have the capability to identify floors of a multistory building. In embodiments, this is accomplished using beacons with unique identifiers that correspond to a floor/level of a building, an altimeter, an altitude derived from geolocation satellite information, or other suitable technique for identifying a level or floor of a building. Such embodiments can accommodate a scenario of when the user's location being in the right position (i.e., last conference room on the left), but on the wrong floor (i.e., first floor not third floor). This is a common situation that occurs when entering a mistaken location. Thus, disclosed embodiments include identifying a building level, and using the building level as a criterion in determining if the proximal floorplan zone is different than the intended floorplan zone.

In some embodiments, triangulation may occur using transmitters that are located outside of the venue. For example, in some embodiments, triangulation may be achieved using local radio station transmitters that are within range of the venue, such as local FM or AM radio stations. Embodiments may include assessing signal strength and additionally performing a station identification using frequency and/or an SSID (service set identifier) or other identifier to make a location assessment.

In some embodiments, an inertial navigation system may be used to determine location within the venue 100. In still some embodiments, an optical system may be used to determine location within the venue 100. Thus, in some embodiments, a location assessment may be made without the use of transmitters. Accordingly, any suitable positioning or navigation system may be used within the scope of embodiments of the invention.

Note that while venue 100 is a college campus building, embodiments of the present invention may be utilized in other venues such as schools, hotels, convention centers, retail establishments, malls, warehouses, hospitals, airports, train stations, and office buildings, to name a few. While typically the venue may be an indoor venue, embodiments may also include venues that are outdoors, or partially outdoors, such as a hotel resort.

Figure 1B:
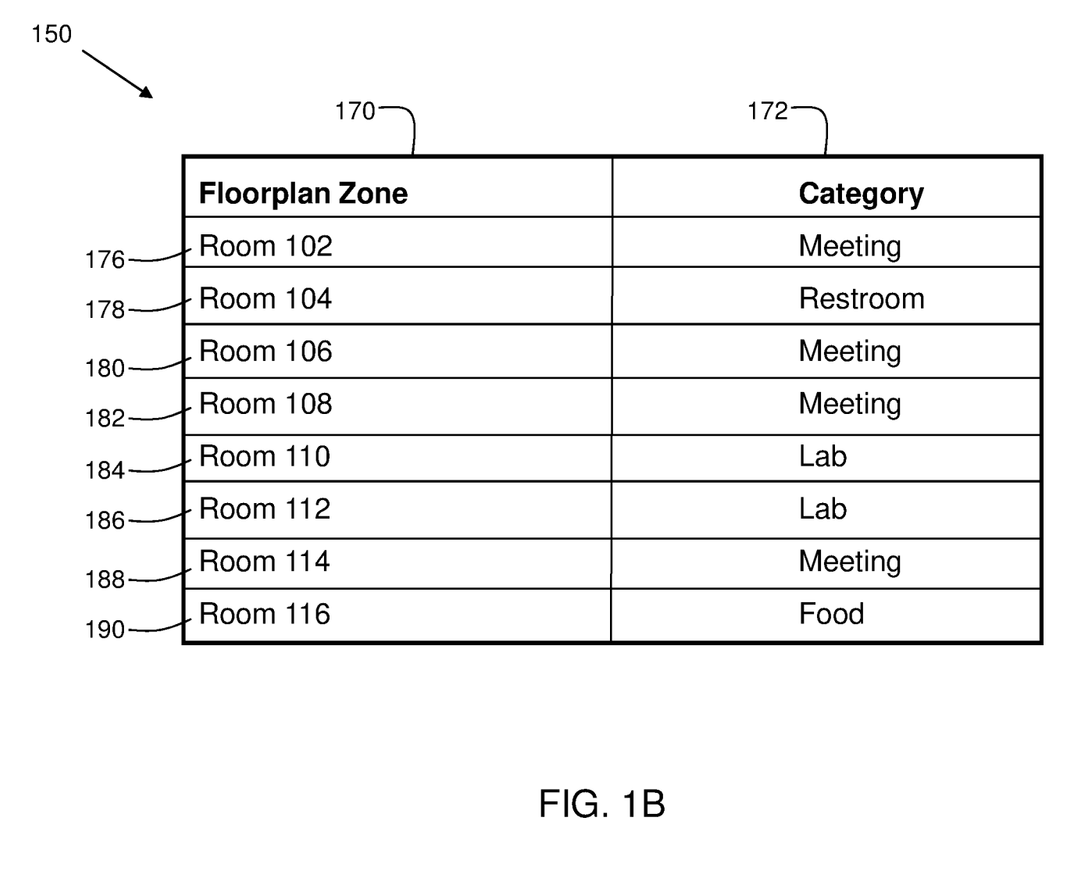
FIG. 1B shows an exemplary data structure for floorplan data.

FIG. 1B shows an exemplary data structure 150 for floorplan data. In embodiments, floorplan data is obtained. Each zone of the floorplan is assigned a category. A zone may be a room or area. In the example, two columns are shown. A first column 170 stores information for "floorplan zone" indicating the particular room or area. A second column 172 stores information for the assigned "category" of the zone. The assigned category may be based on a purpose, intended use, equipment included inside of the room, or other suitable basis. Categories may include, without limitation, classroom, conference room, cubical, lab, office, hotel room, stadium section, operating room, supply room, etc. In embodiments, the floorplan data may be in DWG format, or other suitable format for depicting a physical arrangement of a building structure. The category information may be included as metadata with the file format, or as part of another associated file.

In the example, the venue 100 of FIG. 1A has meeting rooms, laboratories, restrooms, and a cafeteria. In the example, the categories of "Meeting," "Restroom," "Lab," and "Food" exist. Accordingly, the following data is included about the rooms, each assigned as a zone, in campus building venue 100. In row 176, Room 102 is assigned the category of "Meeting.". In row 178, Room 104, which is a restroom, is assigned the category of "Restroom". In row 180, Room 106 is assigned the category of "Meeting". In row 182, Room 108 is assigned the category of "Meeting". In row 184, Room 110, which is a science laboratory, is assigned the category of "Lab". In row 186, Room 112, which is an engineering laboratory, is assigned the category of "Lab". In row 188, Room 114 is assigned the category of "Meeting". In row 190, Room 116, which is the cafeteria, is assigned the category of "Food". In embodiments, this data may be stored on floorplan data server 226 of FIG. 2.

Figure 1C:
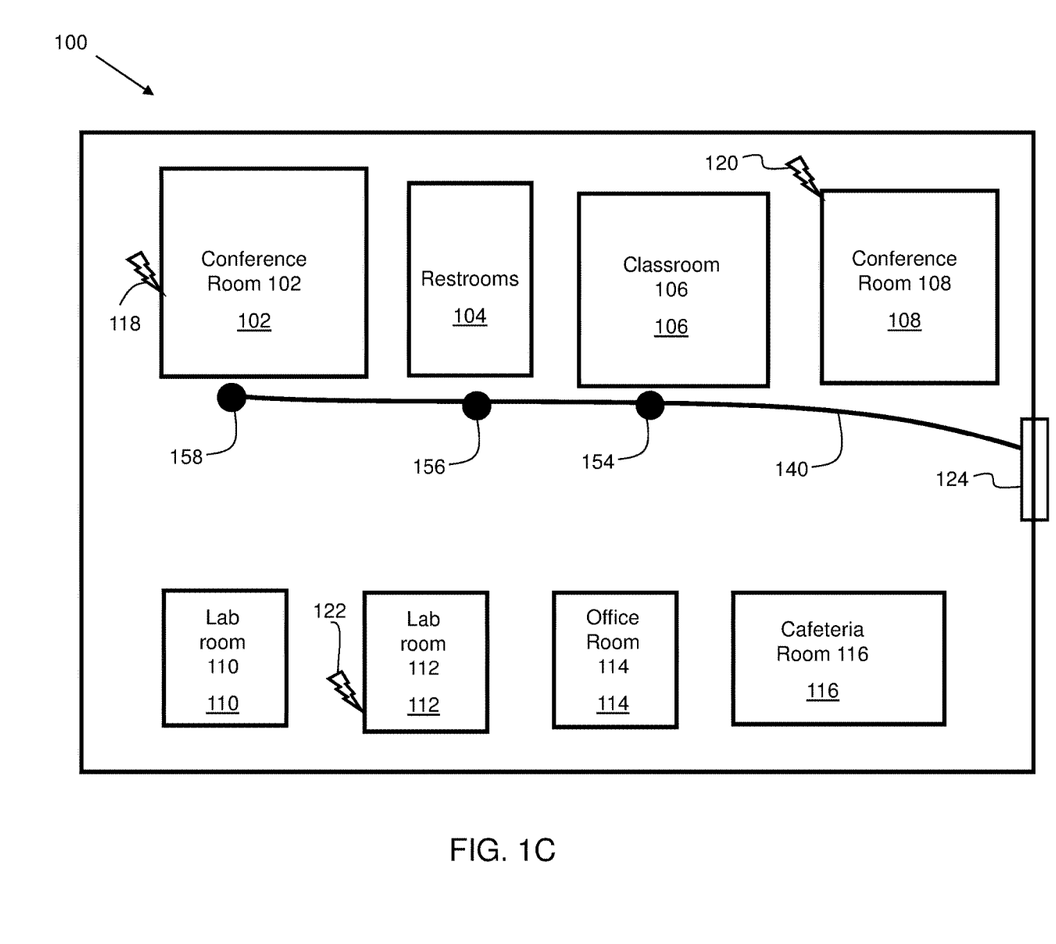
FIG. 1C shows the venue of FIG. 1A with a travel path of a user.

FIG. 1C shows the venue 100 of FIG. 1A with a representation of a travel path of a user. In the example, the user enters through entrance 124, and follows path 140. On path 140, the user passes through point 154 near classroom 106, then passes through point 156 near restrooms 104, and finally continues on to point 158 near conference room 102. When a user starts to slow down (above a threshold of absolute value of deceleration) or halt his/her movement, it may be an indication that the user thinks s/he is at the desired floorplan destination. Below a threshold of absolute value of deceleration, it may be considered that the user is naturally slowing a bit or speeding a bit as human speed is not necessarily continually exact in nature.

In some embodiments, a speed threshold is used as a trigger for detecting when a user may be about to enter a room. When the user speed falls below a predetermined value, it may be interpreted by the system as preparation to enter a nearby room or area. In some embodiments, the predetermined speed threshold ranges from one foot per second to three feet per second. This is an example, and any suitable threshold may be used.

In some embodiments, a deceleration threshold is used as a trigger for detecting when a user may be about to enter a room. When the deceleration exceeds a predetermined value, it may be interpreted by the system as preparation to enter a nearby room or area. In some embodiments, the predetermined deceleration threshold ranges from 1.00 m/s2 to 2.5 m/s2. This is an example, and any suitable threshold may be used.

When embodiments detect the user's deceleration (or speed) with an absolute value of the delta being above a predetermined threshold, the current location of the user is compared with the user's intended destination (intended floorplan zone) at the time. If the current location and the intended destination are of the same category, an alert is issued as it is likely the user has mistaken the room to which s/he is looking to enter. If the current location and the intended destination are of different categories, an alert is not issued. It is assumed that the user has a reason for making the stop, for example, to use the restroom or grab a sandwich on his/her way to the intended destination.

Accordingly, in the example, as the user is traversing path 140 to conference room 102, if embodiments detect her suddenly slowing down to nearly a stop as she is in front of classroom 106 at point 154, an alert will be triggered. The alert is issued because based on data structure 150 (FIG. 1B), a comparison of the categories of the zones corresponding to classroom 106 and conference room 102 (the intended floorplan destination) results in a finding that the two rooms are assigned the same category "Meeting." Thus, in embodiments, in response to detecting a speed reduction to a speed below a predetermined speed threshold in proximity to a floorplan zone that is at a different location than the intended floorplan zone and has an identical category to the intended floorplan zone, an alert is issued on an electronic mobile device associated with the user.

On the other hand, as the user is traversing path 140 to conference room 102, if embodiments detect her suddenly slowing down to nearly a stop as she is in front of restrooms 104 at point 156, an alert will not be triggered. This refraining from issuing an alert is because, based on data structure 150 (FIG. 1B), a comparison of the categories of both restrooms 104 and conference room 102 (the intended floorplan destination) results in a finding that the two zones assigned to those rooms are of a different category from one another. The zone corresponding to Restrooms 104 is assigned the category of "Restrooms" and the zone corresponding to conference room 102 is assigned the category of "Meeting." It is inferred, therefore, that the user must have a reason other than a mistaken location to make the stop. In the example, the user may need to use the restroom or take a look in the mirror prior to her meeting.

Figure 2:
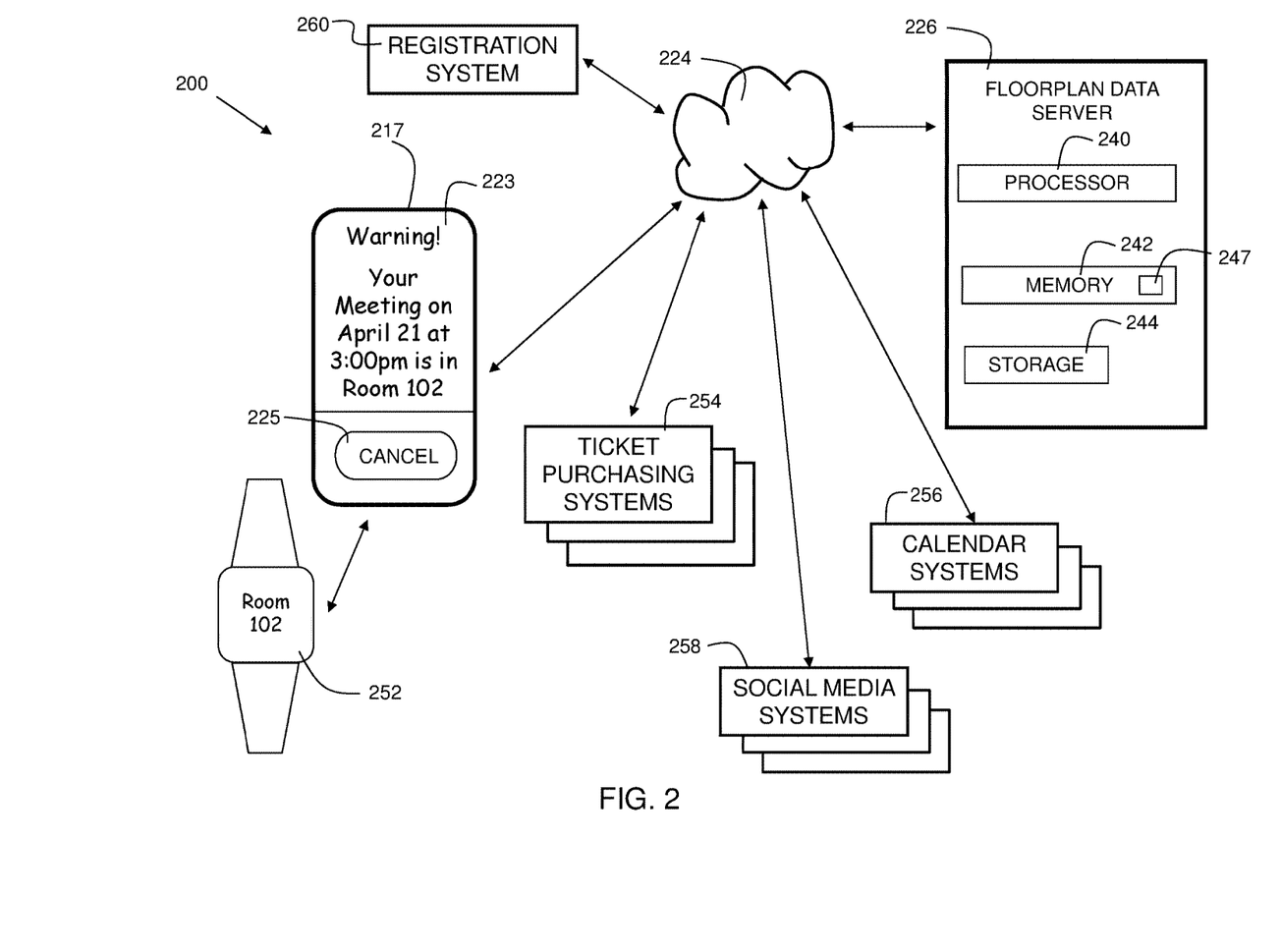
FIG. 2 is a block diagram of an environment for a system in accordance with embodiments of the present invention.

FIG. 2 is a block diagram 200 of an environment for a system in accordance with embodiments of the present invention. A user, wearing wearable device 252, brings a mobile device 217 into a venue where it receives wireless signals from transmitters 118, 120, and 122 (FIG. 1A) to make a location determination. Wearable device 252 may be a watch worn around the user's wrist, and electronic mobile device 217 may be a smartphone, which the user may be carrying or have it in his/her pocket. Wearable device 252 and mobile device 217 are linked in communication with one another via near-field communication, such as Bluetooth®. In some embodiments, wearable device 252 may operate as a stand-alone device alone without need for mobile device 217.

In the example, electronic mobile device 217 communicates via network 224 to a floorplan data server 226. Floorplan data server 226 is an electronic computing device. Network 224 may be the Internet, a wide area network, a local area network, or any other suitable network. Mobile device 217 transmits location information via network 224 to the data server 226. The data server 226 may include a processor 240, memory 242, and storage 244. The processor 240 is coupled to the memory 242 such that it can access instructions 247 stored in memory 242. The processor 240 executes the instructions 247, stored in memory 242, in implementation of embodiments of the present invention. Storage 244 may include one or more hard disks, or other suitable storage technology. Note that while one data server is illustrated in diagram 200, in practice, there may be multiple data servers 226 operating in a distributed manner for load balancing and data redundancy. In embodiments, data servers 226 may implement an object store system utilizing a cloud-based architecture.

Also connected to the network 224 are devices such as ticket purchasing systems 254, social media systems 258, calendar systems 256, and/or registration system 260. These are examples of devices or software programs from which data can be retrieved for use by embodiments in determining where a user is expected to be going or expected to be located at a particular time.

Ticket purchasing systems 254 are systems which allow a user to purchase a ticket to a concert, movie, or other event. Embodiments of the present invention may interface with various purchasing systems to obtain electronic purchase records. In some embodiments, the electronic purchasing systems may contain ticket venue/location information. Embodiments may include obtaining an electronic purchase record, obtaining location information associated with the electronic purchase record, and obtaining date information associated with the electronic purchase record. Example systems include StubHub, Fandango, etc.

In an example use case utilizing a ticket purchasing system 254, a user purchases movie tickets. The ticket purchasing system stores records, therefore, of the timeslot (date and time) and location of the venue (and seating area within the venue). The venue may have ten theaters, each corresponding to a zone categorized as "theater," plus a zone categorized as "restrooms", and a zone with a snack stand categorized as "food." Embodiments can scrape or otherwise retrieve this data via an API from the systems 254. In this way, embodiments are able to detect that the user is expected to be in theater #4 (based on information in/about the ticket purchased), and will trigger an alert, via the user's mobile device, if s/he slows down by theater #6. Another example use case is that the section and seat of a stadium are retrieved from the system, and a user is alerted for entering the wrong section in the stadium.

Social media systems 258 are systems which allow users to start accounts and connect their accounts to other accounts for information sharing. When a user shares text, images, videos, etc., to his/her account, it may appear in the feed of other user's accounts. Example systems include Facebook®, LinkedIn®, and Twitter®. In an example use case, a user may indicate in a text post, "I am so excited to be presenting tonight in classroom 106 at 6 pm—Come join me!" Embodiments may scrape from social media systems 258 the data about the location, time, and date (e.g. tonight) to determine the intended floorplan destination. Referring to the venue of FIG. 1A, when embodiments detect the user slows down at 5:50 pm near lab room 112, an alert is not triggered to indicate the wrong zone. This is because, referring to the data structure 150 of FIG. 1B, classroom 106 and lab room 112 are assigned different categories. It may be assumed then that the user has a reason to make the stop, such as to meet a friend beforehand and walk to classroom 106 together.

Calendar systems 256 allow users to enter data or share data with others about meetings, events, etc., to an electronic calendar for storage and reminders. Data about time, location, data, purpose, and/or participants can be entered for each calendar entry. Microsoft® Outlook® is an example system. This data may be scraped (or otherwise retrieved) by embodiments for determining a user's schedule (i.e., where the user is expected to be at particular times to identify intended floorplan destination(s)).

Registration system 260 may be a school registration system or a conference registration system. In this way, students can register for classes, and conference attendees can register for various sessions. The system may store the dates, times, and locations of the classes or sessions. This data may be scraped by embodiments for determining a user's schedule to identify intended floorplan destination(s).

In an example use case utilizing calendar systems 256, a user may enter a calendar entry for the date of April 21, at a time slot of 3 pm to 4 pm in a location of lab room 110 for the purpose of a teacher meeting. Embodiments may scrape from calendar systems 256 for the data. Referring to the venue of FIG. 1A, if embodiments detect that the user slows down at 2:50 pm near lab room 112 on April 21st, an alert is triggered, via the user's mobile device, to indicate the wrong zone since the zones corresponding to lab room 110 and lab room 112 are each assigned the same category on data structure 150 of FIG. 1B.

In some embodiments, the alert includes a visual alert. In some embodiments, the visual alert includes an intended floorplan zone designator. In the example of FIG. 2, the alert on the user's mobile device screen recites, "Warning! Your Meeting on April 21 at 3:00 pm is in Room 102." "Room 102" is the intended floorplan zone designator (i.e. the location the user is expected/supposed to be at the time). The screen may further include an electronic button 225 (or other suitable mechanism) for canceling or ignoring the warning. This is such that the user can remove the warning from the screen, or ignore the warning. In some embodiments, if the user selects "cancel" to ignore the warning, embodiments will reissue the warning again after a predetermined time period if the user has not been detected to be at the expected floorplan destination during that time period.

Figure 3:
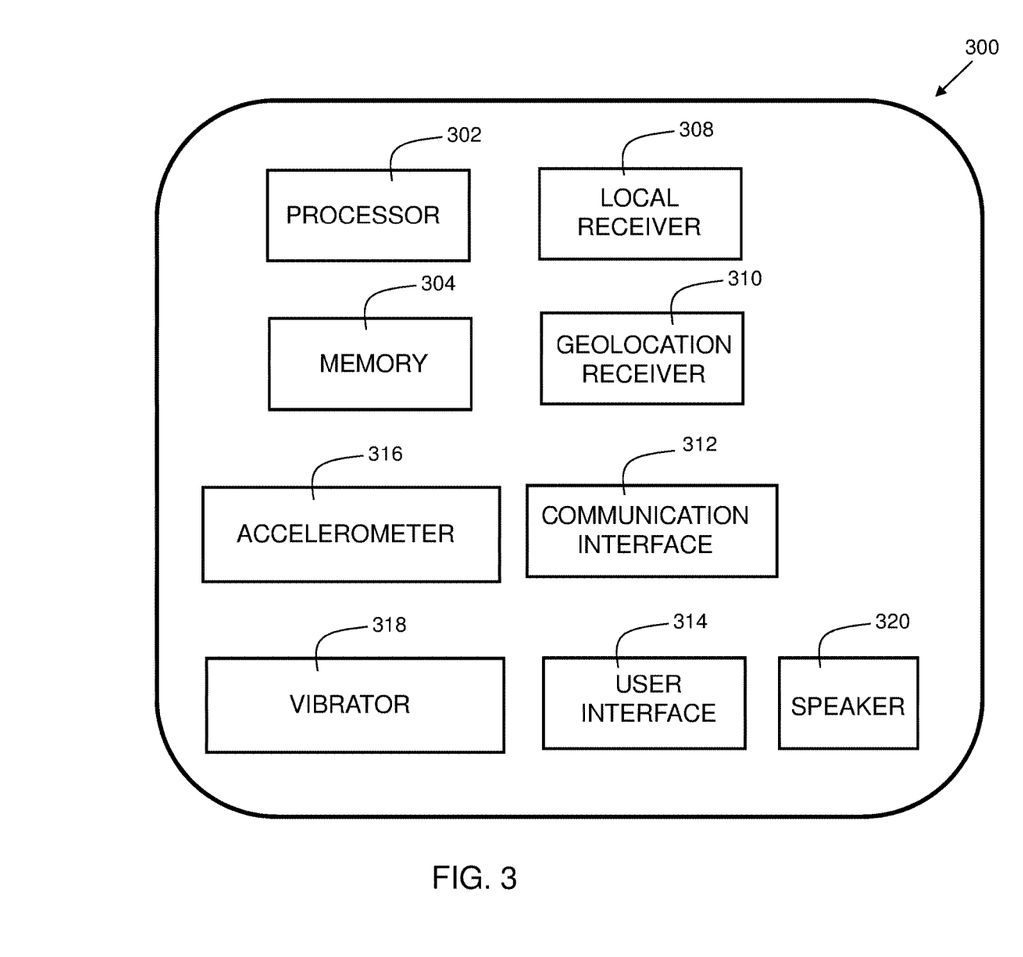
FIG. 3 is a block diagram of an example of a mobile device used in embodiments of the present invention.

FIG. 3 is a block diagram of an example of a mobile device 300 used in embodiments of the present invention. The mobile device may be a smartphone or wearable device. Device 300 includes a processor 302, which is coupled to a memory 304. Memory 304 may include dynamic random-access memory (DRAM), static random-access memory (SRAM), magnetic storage, and/or a read-only memory such as flash, EEPROM, optical storage, or other suitable memory. In some embodiments, the memory 304 may not be a transitory signal per se. Memory 304 stores instructions, which when executed by the processor, implement steps of the present invention.

Device 300 further includes local receiver 308. This may be for Bluetooth®, ZigBee®, or other suitable near-field communication system. This may be for device 300 to link with a wearable device in some embodiments.

Device 300 further includes geolocation receiver 310. This may operate with global positioning satellite systems, such as GPS, GLONASS, Galileo, or other suitable system.

The device 300 further includes a communication interface 312. In embodiments, the communication interface 312 may include a wireless communication interface that includes modulators, demodulators, and antennas for a variety of wireless protocols including, but not limited to, Bluetooth™, Wi-Fi, and/or cellular communication protocols for communication over a computer network.

Device 300 further includes a user interface 314. This may include a display, touchscreen, keyboard, mouse, or other suitable interface. In some embodiments, the display may be touch-sensitive.

The device 300 may further include an accelerometer 316. The accelerometer may be capacitive, piezoelectric resistive, capacitive spring mass system base, DC response, electromechanical servo based, high gravity, high temperature, a laser accelerometer, or other type now known or hereafter developed. The accelerometer 316 may be used to measure a user's deceleration (or acceleration) while traversing a venue.

The device 300 may further include a vibrator 318. The vibration motor may be a geared motor mechanism, which may have, for instance, an asymmetrical load affixed to a rotating shaft, a linear resonant actuator, or a pancake vibration motor, etc. Accordingly, in some embodiments, the alert includes a tactile alert. The device may vibrate as an alert.

The device 300 may further include a speaker 320. The speaker may be powered or passive. Accordingly, in some embodiments, the alert includes an audible alert. The alert may be a beep, sound effect, song, or other suitable audio.

Figure 4:
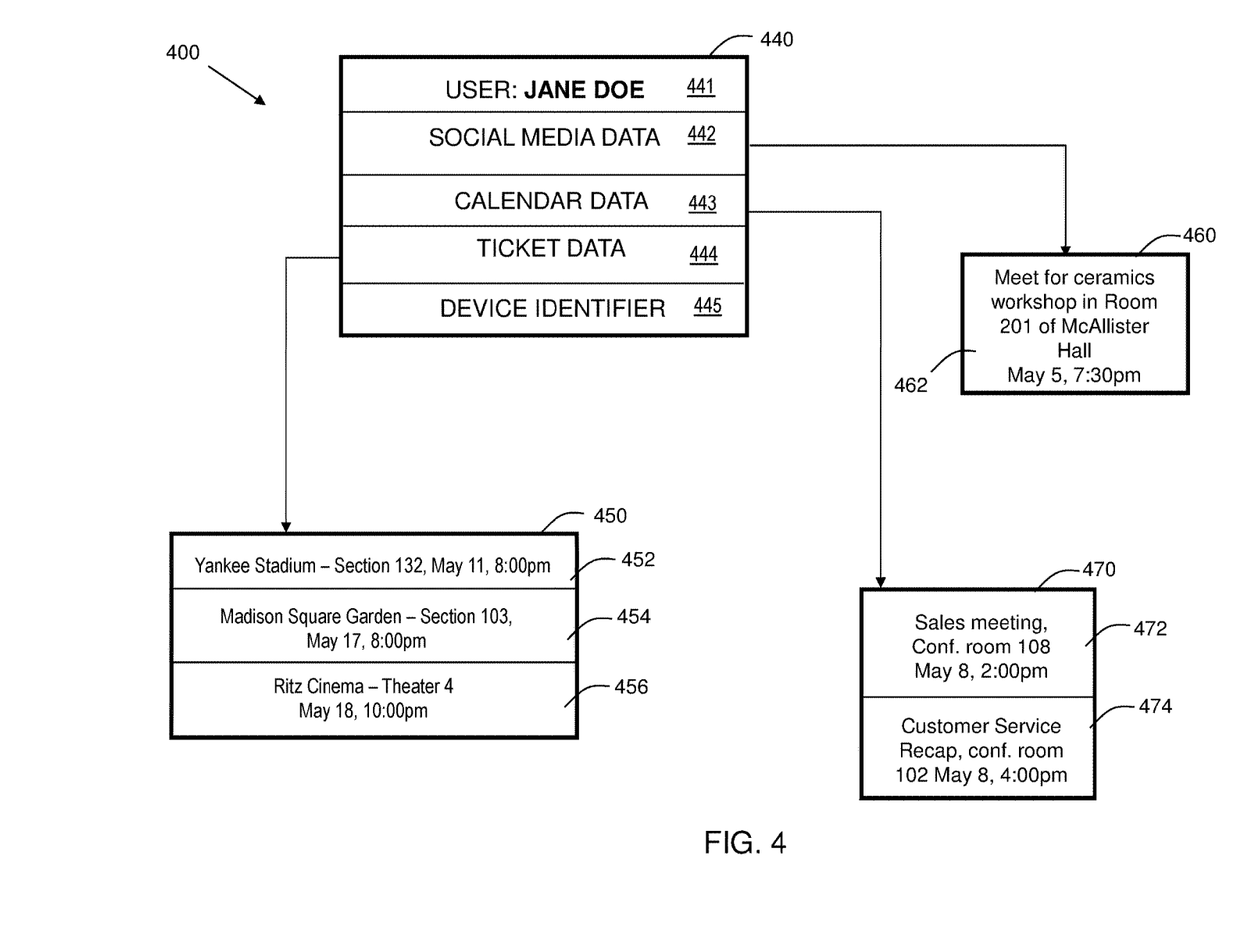
FIG. 4 illustrates exemplary data structures for embodiments of the present invention.

FIG. 4 illustrates a diagram 400 of exemplary data structures for embodiments of the present invention. These data structures may be stored in storage 244 of system 226 of FIG. 2. The data may be scraped from various systems such as systems 254, 256, 258, and 260 of FIG. 2. Data table 440 includes fields 441-445. Field 441 stores user name (or identifier). Field 442 stores social media data. Field 443 stores calendar data. Field 444 stores ticket data. Field 445 stores a device identifier. In embodiments, the device identifier may include a serial number, telephone number, MAC address, or other unique identifier associated with the user's mobile electronic device.

Data table 460 stores information in field 462 scraped from social media systems 258 of FIG. 2. The information includes: "Meet for ceramics workshop in Room 201 of McAllister Hall May 5, 7:30 pm."

Data table 470 stores information in fields 472 and 474 scraped from calendar systems 256 of FIG. 2. Field 472 includes the following, "Sales meeting, Conf. room 108 May 8, 2:00 pm." Field 474 includes "Customer Service Recap, conf. room 102 May 8, 4:00 pm."

Figure 5:
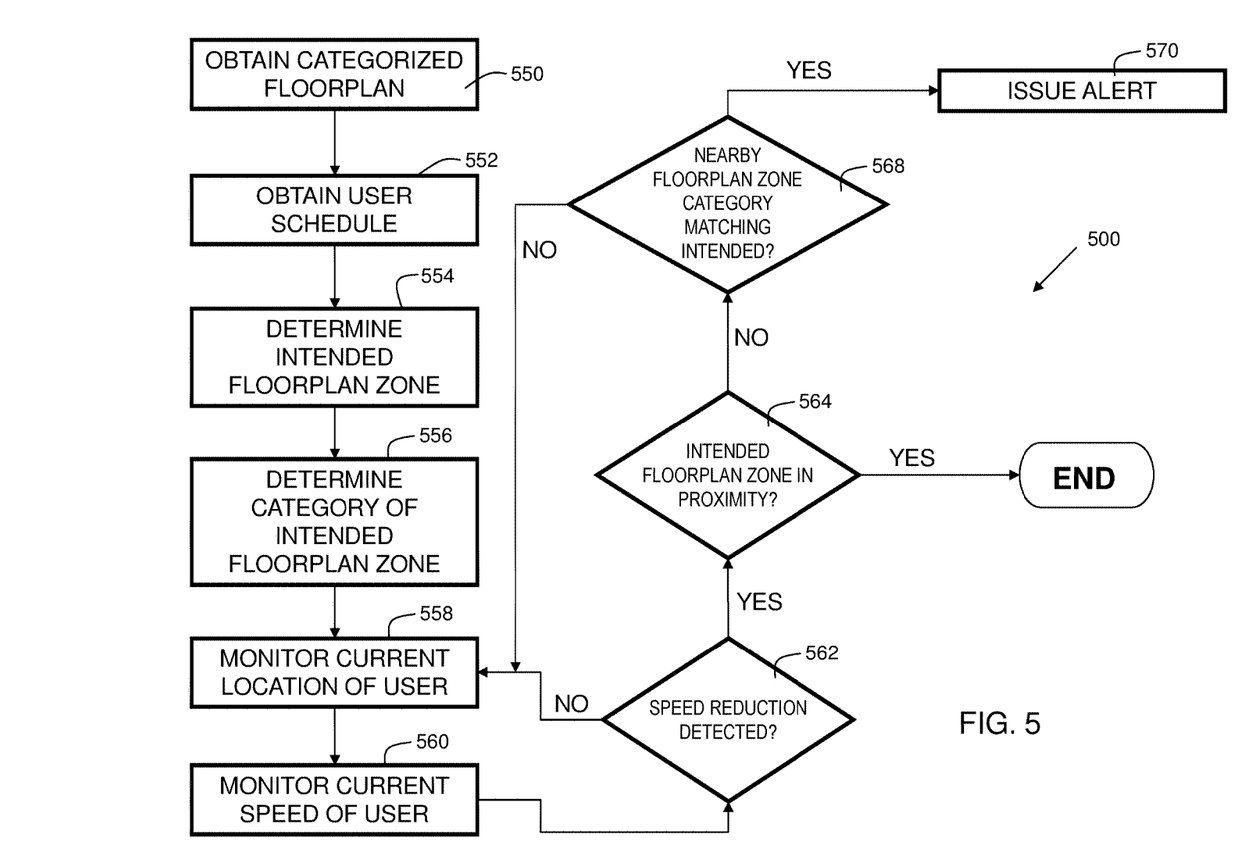
FIG. 5 is a flowchart illustrating process steps for embodiments of the present invention.

Data table 450 stores information in fields 452, 454, and 456, scraped from a ticket purchasing system 254 of FIG. 2. Field 452 includes "Yankee Stadium—Section 132, May 11, 8:00 pm." Field 454 includes "Madison Square Garden—Section 103, May 17, 8:00 pm." Field 456 includes "Ritz Cinema—Theater 4 May 18, 10:00 pm." FIG. 5 is a flowchart 500 including process steps for embodiments of the present invention. At 550, a categorized venue floorplan is obtained. The categorized venue floorplan contains layout data for a venue, indicating various rooms and areas, as well as an intended purpose of each area (as shown in FIG. 1B). At 552, a user schedule is obtained. This may be based on data from social media systems, calendaring systems, ticket purchasing systems, conference/class registration systems, electronic purchase records, etc.

At 554, an intended floorplan destination, and its corresponding zone, is determined (collectively referred to as intended floorplan zone). The determination may be based on the user's schedule. At 556, a category of the intended floorplan zone is determined. This may be determined from a database, which stores zones in association with categories. In some embodiments, the database may be populated through social contributions, crowdsourced data, and/or other sources.

At 558, the current location of the user is monitored. This may be based on triangulation, IPS, GPS, or other suitable system. At 560, the current speed of the user is monitored. This may be based on GPS, or other suitable system. At 562, it is determined if a speed reduction (or deceleration) is detected with the absolute value of the delta being above a predetermined threshold. If no, the process returns to block 558. If yes, at 564, it is determined whether an intended floorplan zone is in proximity. If yes, the process ends. If no, the process proceeds to 568 where it is determined whether a nearby floorplan zone category matching is intended. If no, the process returns to block 558. If yes, at 570, an alert is triggered.

In embodiments, the user is alerted with a notification if it is determined that s/he is potentially entering a wrong location. Accordingly, the user is not being "directed" on which way to go, but rather being notified if s/he enters a potentially wrong location.

Figure 6:
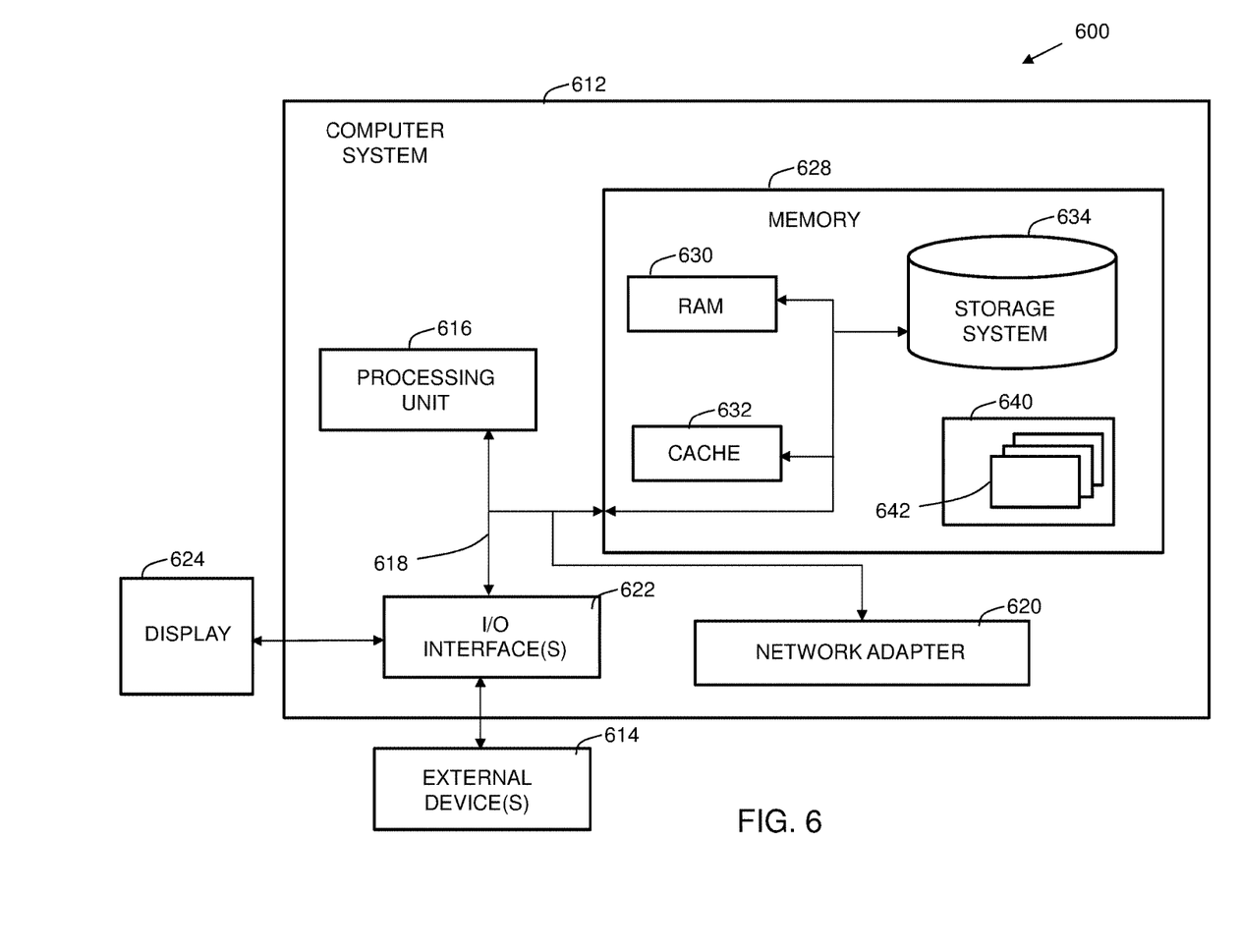
FIG. 6 shows additional details of an embodiment of the present invention.

Referring now to FIG. 6, a computerized implementation 600 of an embodiment for notification of incorrect locations is described in further detail. Computerized implementation 600 is only one example of a suitable implementation and is not intended to suggest any limitation as to the scope of use or functionality of embodiments of the invention described herein. Regardless, computerized implementation 600 is capable of being implemented and/or performing any of the functionality set forth hereinabove.

In computerized implementation 600, there is a computer system 612. Examples of well-known computing systems, environments, and/or configurations that may be suitable for use with computer system 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 612 is intended to demonstrate that some or all of the components of implementation 600 could be deployed, managed, serviced, etc., by a service provider who offers to implement, deploy, and/or perform the functions of the present invention for others.

Computer system 612 is intended to represent any type of computer system that may be implemented in deploying/realizing the teachings recited herein. Computer system 612 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system 612 represents an illustrative system for gathering time-annotated web interaction and biometric sensor data of web page users to extrapolate emotional responses to a web page and generating an aggregated emotional map indicative of the emotional responses. It should be understood that any other computers implemented under the present invention may have different components/software but can perform similar functions.

Computer system 612 in computerized implementation 600 is shown in the form of a general-purpose computing device. The components of computer system 612 may include, but are not limited to, one or more processors or processing units 616, a system memory 628, and a bus 618 that couples various system components including system memory 628 to processing unit 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 616 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 616 collects and routes signals representing inputs and outputs between external devices 614 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 616 executes computer program code, such as program code for gathering time-annotated web interaction and biometric sensor data of web page users to extrapolate emotional responses to a web page and generating an aggregated emotional map indicative of the emotional responses, which is stored in memory 628, storage system 634, and/or program/utility 640. While executing computer program code, processing unit 616 can read and/or write data to/from memory 628, storage system 634, and program/utility 640.

Computer system 612 typically includes a variety of computer system readable media. Such media may be any available media that is accessible by computer system 612, and it includes both volatile and non-volatile media, removable and non-removable media.

System memory 628 can include computer system readable media in the form of volatile memory, such as random-access memory (RAM) 630 and/or cache memory 632. Computer system 612 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention. Program code embodied on a computer readable medium may be transmitted using any appropriate medium including, but not limited to, wireless, wireline, optical fiber cable, radio-frequency (RF), etc., or any suitable combination of the foregoing.

Program/utility 640, having a set (at least one) of program modules 642, may be stored in memory 628 by way of example, and not limitation. Memory 628 may also have an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system 612 may also communicate with one or more external devices 614 such as a keyboard, a pointing device, a display 624, etc., one or more devices that enable a consumer to interact with computer system 612, and/or any devices (e.g., network card, modem, etc.) that enable computer system 612 to communicate with one or more other computing devices. Such communication can occur via I/O interfaces 622. Still yet, computer system 612 can communicate with one or more networks such as a local area network (LAN), a general wide area network (WAN), and/or a public network (e.g., the Internet) via network adapter 620. As depicted, network adapter 620 communicates with the other components of computer system 612 via bus 618. It should be understood that although not shown, other hardware and/or software components could be used in conjunction with computer system 612. Examples include, but are not limited to: microcode, device drivers, redundant processing units, external disk drive arrays, RAID systems, tape drives, and data archival storage systems, etc.

As can now be appreciated, disclosed embodiments improve the technical field of notification of potential entry into an incorrect location. A user location is monitored via a mobile electronic device (e.g., smartphone, smart watch, etc.) and an indoor positioning system. The floorplans are categorized for different uses, such as meetings, restrooms, closets, etc. If the category of a nearby floorplan zone is not the same, then no alert is issued. This handles a scenario where a user may stop at a restroom prior to entering a meeting room. It is desirable to not issue an incorrect entry alert for the restroom. By comparing the categories, alerts for stopping at restrooms are prevented. With disclosed embodiments, even when a user is not being directed (e.g., via navigation instructions), they can still be alerted regarding potential entry into an incorrect location. The change in speed (e.g., slowing down) of the user is used to infer possible entry into a nearby room. This provides an unobtrusive way to alert users before entering a room. Thus, disclosed embodiments can prevent disruptions, thereby increasing productivity and also serving to reduce embarrassment of users caused by entering the wrong location within a venue.

Note: the terms "StubHub," "Fandango," "Facebook," "LinkedIn," and/or "Twitter" may be subject to trademark rights in various jurisdictions throughout the world and are used here only in reference to the products or services properly denominated by the mark(s) to the extent that such trademark rights may exist.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method comprising:
   obtaining a categorized venue floorplan;
   obtaining a schedule for a user;
   determining an intended floorplan zone corresponding to a timeslot for the schedule;
   determining a category for the intended floorplan zone;
   monitoring a current location of the user;
   monitoring a current speed of the user; and
   in response to detecting a speed reduction to a speed below a predetermined speed threshold in proximity to a floorplan zone that is at a different location than the intended floorplan zone and has an identical category to the intended floorplan zone, issuing an alert on an electronic mobile device associated with the user.

2. The method of claim 1, wherein the predetermined speed threshold ranges from one foot per second to three feet per second.

3. The method of claim 1, wherein the alert includes an audible alert.

4. The method of claim 1, wherein the alert includes a tactile alert.

5. The method of claim 1, wherein the alert includes a visual alert.

6. The method of claim 5, wherein the visual alert includes an intended floorplan zone designator.

7. The method of claim 1, wherein obtaining the schedule comprises:
   obtaining an electronic purchase record;
   obtaining location information associated with the electronic purchase record; and
   obtaining timeslot information associated with the electronic purchase record.

8. An electronic computing device comprising:
   a processor;
   a memory coupled to the processor, the memory containing instructions, that when executed by the processor, perform the steps of:
   obtaining a categorized venue floorplan;
   obtaining a schedule for a user;
   determining an intended floorplan zone corresponding to a timeslot for the schedule;
   determining a category for the intended floorplan zone;
   monitoring a current location of the user;
   monitoring a current speed of the user; and
   in response to detecting a speed reduction to a speed below a predetermined speed threshold in proximity to a floorplan zone that is at a different location than the intended floorplan zone and has an identical category to the intended floorplan zone, issuing an alert on an electronic mobile device associated with the user.

9. The electronic computing device of claim 8, wherein the memory further comprises instructions, that when executed by the processor, perform the step of setting the predetermined speed threshold in a range from one foot per second to three feet per second.

10. The electronic computing device of claim 8, wherein the memory further comprises instructions, that when executed by the processor, perform the step of generating an audible alert.

11. The electronic computing device of claim 8, wherein the memory further comprises instructions, that when executed by the processor, perform the step of generating a tactile alert.

12. The electronic computing device of claim 8, wherein the memory further comprises instructions, that when executed by the processor, perform the step of generating a visual alert.

13. The electronic computing device of claim 12, wherein the memory further comprises instructions, that when executed by the processor, perform the step of rendering an intended floorplan zone designator in the visual alert.

14. The electronic computing device of claim 8, wherein the memory further comprises instructions, that when executed by the processor, perform the steps of:
   obtaining an electronic purchase record;
   obtaining location information associated with the electronic purchase record; and
   obtaining timeslot information associated with the electronic purchase record.

15. A computer program product for an electronic computing device comprising a computer readable hardware storage device having program instructions embodied therewith, the program instructions executable by a processor to cause the electronic computing device to:
   obtain a categorized venue floorplan;
   obtain a schedule for a user;
   determine an intended floorplan zone corresponding to a timeslot for the schedule;
   determine a category for the intended floorplan zone;
   monitor a current location of the user;
   monitor a current speed of the user; and
   in response to detecting a speed reduction to a speed below a predetermined speed threshold in proximity to a floorplan zone that is at a different location than the intended floorplan zone and has an identical category to the intended floorplan zone, issue an alert on an electronic mobile device associated with the user.

16. The computer program product of claim 15, wherein the computer readable hardware storage device includes program instructions executable by the processor to cause the electronic computing device to perform the step of generating an audible alert.

17. The computer program product of claim 15, wherein the computer readable hardware storage device includes program instructions executable by the processor to cause the electronic computing device to perform the step of generating a tactile alert.

18. The computer program product of claim 15, wherein the computer readable hardware storage device includes program instructions executable by the processor to cause the electronic computing device to perform the step of generating a visual alert.

19. The computer program product of claim 18, wherein the computer readable hardware storage device includes program instructions executable by the processor to cause the electronic computing device to perform the step of generating rendering an intended floorplan zone designator in the visual alert.

20. The computer program product of claim 15, wherein the computer readable hardware storage device includes program instructions executable by the processor to cause the electronic computing device to perform the steps of:
- obtaining an electronic purchase record;
- obtaining location information associated with the electronic purchase record; and
- obtaining timeslot information associated with the electronic purchase record.

* * * * *